Jan. 28, 1941.  L. MACK ET AL  2,230,203
AIR DISTRIBUTING APPARATUS
Filed May 5, 1939   2 Sheets-Sheet 1
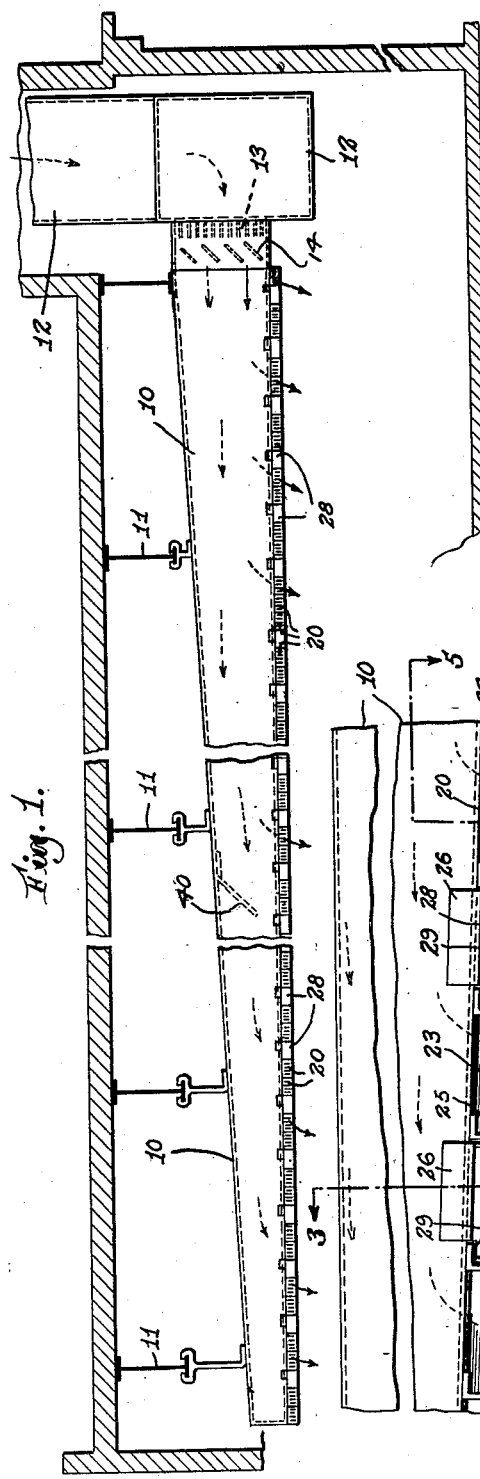
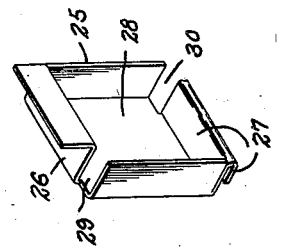
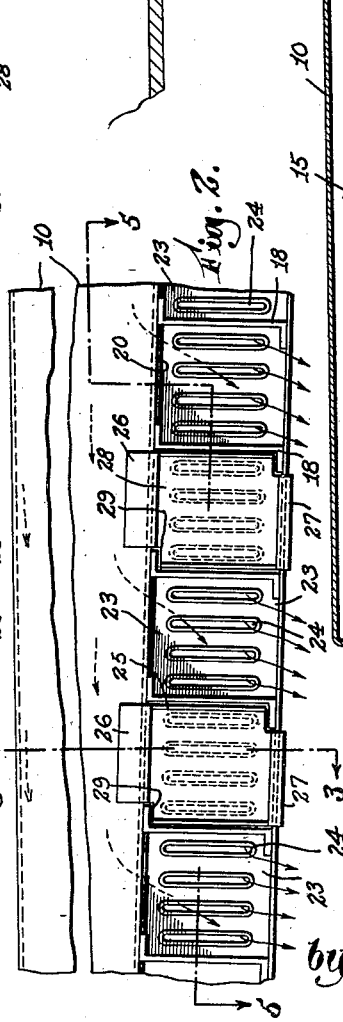
Inventor
LUDWIG MACK
MELVILLE G. KERSHAW
by Robert J. Palmer
Attorney Jan. 28, 1941.   L. MACK ET AL   2,230,203
AIR DISTRIBUTING APPARATUS
Filed May 5, 1939   2 Sheets-Sheet 2

Inventor
LUDWIG MACK
MELVILLE G. KERSHAW
by Robert J. Palmer
Attorney

Patented Jan. 28, 1941

2,230,203

UNITED STATES PATENT OFFICE 2,230,203

AIR DISTRIBUTING APPARATUS

Ludwig Mack and Melville G. Kershaw, Philadelphia, Pa., assignors to The Cooling & Air Conditioning Corporation, Hyde Park, Boston, Mass., a corporation of New York Application May 5, 1939, Serial No. 271,916

3 Claims. (Cl. 98—40)

This invention relates to fluid distributing systems and relates more particularly to distributing ducts and distributing duct systems for the supply and distribution of gases such as air.

Overhead ducts having a plurality of small spaced outlets have been proposed for the distribution of conditioned air. It has been customary however, for the outlets to communicate directly with the space to be served so that the air is discharged at relatively high velocity directly into the space. This high velocity jet discharge provides an ejector effect in which the discharged air induces the flow of air in the space served. This is undesirable, especially in industrial ventilating and air conditioning systems for too great air movements are created in the vicinity of processing machines and apparatus, for example, and when the air is cooled, drafts are created.

According to a feature of this invention, the air or other gas is discharged and distributed in such a manner that it does not induce air currents in the area served.

According to another feature of this invention, the fluid to be supplied is discharged equally and evenly and at relative low velocity from a longitudinal duct assembly.

According to another feature of the invention, means is provided for blocking off by groups, the air flow from selected portions of the duct assembly.

These and other features are provided in one embodiment of the invention in a longitudinal duct assembly having an inner wall which contains a plurality of longitudinally spaced relatively small orifices. The air or other gas to be supplied is built up under static pressure within the duct assembly so that the same volume is discharged from the orifice most remote from the supply source as from the orifice nearest same. This results, of course, in the air passing through the orifices at a relatively high velocity. The orifices are however, separated into groups by transverse walls which extend to the discharge edge or edges of the duct assembly, to provide a plurality of chambers of substantial size into which the air from the orifices enters and expands. The proportions of these chambers are so chosen that the air or other gas discharged from the orifices has so expanded and consequentially has its velocity so reduced, that it flows from the duct assembly into the space to be served, at a relatively low velocity.

An object of the invention is to properly distribute air or other gases without the production of undesirable air flow within the space served.

Other objects of the invention will be apparent from the following description and with reference to the drawings.

The invention will now be described with reference to the drawings, of which:

Fig. 1 is a view in elevation with portions in dotted outline, of one embodiment of an air distributing duct assembly according to this invention;

Fig. 2 is a greatly enlarged view of a portion of the duct assembly of Fig. 1;

Fig. 3 is a sectional view along the lines 3—3 of Fig. 2;

Fig. 4 is a projected view of one of the closure members of Figs. 2 and 3;

Figure 5:
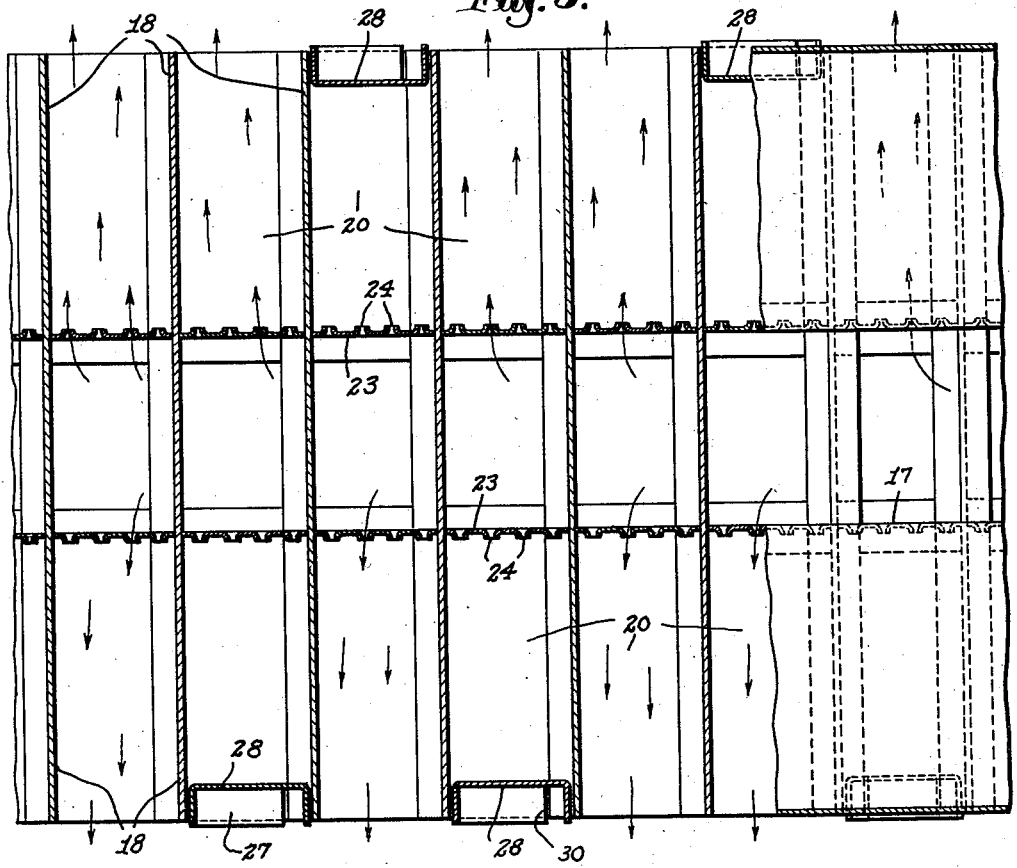
Fig. 5 is a sectional view along the lines 5—5 of Fig. 2.

With reference to Figs. 1 to 5 inclusive, the longitudinal duct assembly indicated generally by 10 may be suspended from the ceiling of a room by the I beams 11 and may be supplied with conditioned air from a central source through the duct 12 past the stationary vane 13 and the louvre dampers 14.

The duct assembly 10 is divided into two portions, the supply portion 15 and the distributing portion 16 which includes the distributing ducts 20. Air from the duct 12 discharges into the supply duct 15 and passes along the length of the duct through the opening 17 into the distributing portion 16. The distributing portion 16 is divided into a plurality of sections by the Z-bar walls 18, shown most clearly by Figs. 2 and 5. The lower wall 19 is connected to the Z-bars 18 and forms the lowermost wall of the duct, providing air guiding channels or distributing ducts 20 between it and the lower wall 21 of the supply portion 15 of the duct 10. The opening 17 provides an air passage which is perpendicular to the axis of the supply duct 15 and to the axes of the distributing ducts 20.

The squeeze damper 40 is provided for decreasing the volume of air supplied to the outer portion of the duct, or for shutting off the outer portion of the duct assembly, when this is desirable.

Arranged on each side of the opening 17 and between the Z-bars 18 are the perforated orifice plates 23. The portions of the plates between the Z-bars contain four slots or orifices 24 although more or less slots could be provided.

These slots may be formed to converge in the direction of air flow as shown by Figs. 3 and 5, although this is not essential.

The orifice plates 23 form perforated inner walls for the distributing portions of the duct assembly. Their distances from the discharge edges of the duct assembly are so chosen with respect to depth, etc., of the duct assembly that the Z-bars 18 together with the lower walls 19 and upper walls 20 form a plurality of expansion chambers of such area that the air discharged at relatively high velocity into them from the slots or orifices 24 is so expanded and its velocity so reduced before it reaches the discharge edges of the duct assembly, that the air discharged has such a relatively low velocity that it does not function in ejector action to induce any material air currents.

The orifice plates 23 are seen to form partitions which extend perpendicular to the lower longitudinal wall of the supply duct 15. The lower wall 21 of the supply duct is seen also to form the common upper wall of the distributing ducts 20.

The air distributing system according to this invention may be used for example, for supplying conditioned air to manufacturing or processing rooms or industrial plants, which rooms may be of relatively large area having portions which need not be directly supplied with conditioned air. Accordingly, the closure members 25 are designed to fit in between and cooperate with adjacent Z-bars 18 to close off one or more of the individual duct sections formed by adjacent Z-bars. The member 25 has the upper portion 26 which fits against the wall 21 of the duct assembly 10; the lower portion 27 which fits over, around and under the lower wall 19 of the duct, and the continuous wall portion 28 which closes off the space between the adjacent Z-bars 18 and the walls 19 and 21, when placed as shown by Fig. 2 between adjacent Z-bars. The upper portion 26 of the member 25 is cut away to form the opening 29 to receive the upper cross bar of a Z-bar and the upper portion 27 of the member 25 is cut away to receive the lower cross bar of the adjacent Z-bar.

The closure members 25 may be quickly and easily applied to one or both sides of the duct assembly 10 at one or more desired points along its length to exactly control the distribution of the conditioned air as required by floor conditions.

Figure 6:
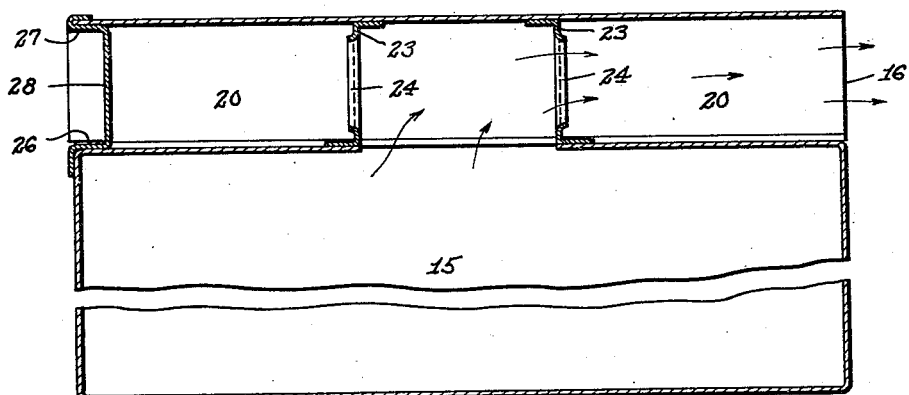
Fig. 6 is a cross-sectional view of another embodiment of a duct assembly according to this invention, similar to Fig. 3 except that the orifices are above instead of below the main body of the duct assembly.

The arrangement shown by Fig. 6 is like that of Fig. 3 except that the supply portion 15 of the duct assembly is lowermost and the distributing portion 16 is uppermost. This may be desirable for rooms having relatively low ceilings.

While the duct assembly has been described as extending horizontally, it could extend vertically for certain types of installations. It is not necessary that the orifices be in the form of vertical slots as they may be horizontal slots. The orifices need not be in the form of slots as apertures having other shapes may be used.

While the duct assembly has been described as discharging from two sides, it could of course be arranged to discharge from only one side.

While embodiments of the invention have been described for the purpose of illustration, it should be understood that the invention is not limited to the exact arrangement and apparatus disclosed, as many departures may be made by those skilled in the art without departing from the spirit of the invention.

What is claimed is:

1. A duct assembly comprising a longitudinal supply duct, a plurality of distributing ducts having axes extending crosswise said duct and adapted to discharge air from their ends in directions substantially parallel to their axes, a partition extending substantially perpendicular to a longitudinal wall of said supply duct and extending crosswise said distributing ducts, means forming a plurality of orifices in said partition, and means forming an air passage extending substantially perpendicular to the axis of said supply duct and to the axes of said distributing ducts, connecting said supply duct and said orifices.

2. A duct assembly comprising a longitudinal supply duct, a plurality of distributing ducts having axes extending crosswise said duct and adapted to discharge air from their ends in directions substantially parallel to their axes, a partition extending substantially perpendicular to a longitudinal wall of said supply duct and extending crosswise said distributing ducts, means forming a plurality of orifices in said partition, and means forming an air passage extending substantially perpendicular to the axis of said supply duct and to the axes of said distributing ducts, connecting said supply duct and said orifices, said longitudinal wall forming a wall common to all of said distributing ducts.

3. A duct assembly comprising a longitudinal supply duct, a plurality of distributing ducts having common interconnecting walls, having axes extending crosswise said duct and adapted to discharge air from their ends in directions substantially parallel to their axes, a partition extending substantially perpendicular to a longitudinal wall of said supply duct and extending crosswise said distributing ducts, means forming a plurality of orifices in said partition, and means forming an air passage extending substantially perpendicular to the axis of said supply duct and to the axes of said distributing ducts, connecting said supply duct and said orifices, said longitudinal wall forming a wall common to all of said distributing ducts.

LUDWIG MACK.
MELVILLE G. KERSHAW.